March 15, 1960 — N. H. CHERRY — 2,928,947
TESTING APPARATUS
Filed Nov. 6, 1953 — 4 Sheets-Sheet 1

INVENTOR.
NORMAN H. CHERRY
BY
ATTORNEYS

March 15, 1960 — N. H. CHERRY — 2,928,947
TESTING APPARATUS
Filed Nov. 6, 1953 — 4 Sheets-Sheet 2
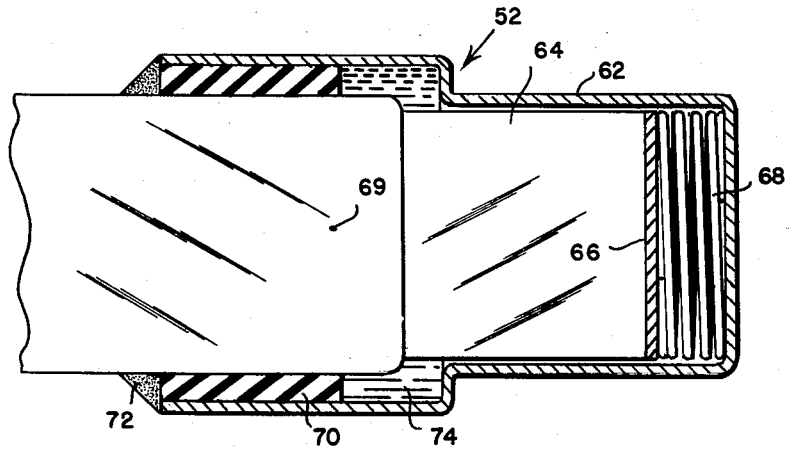
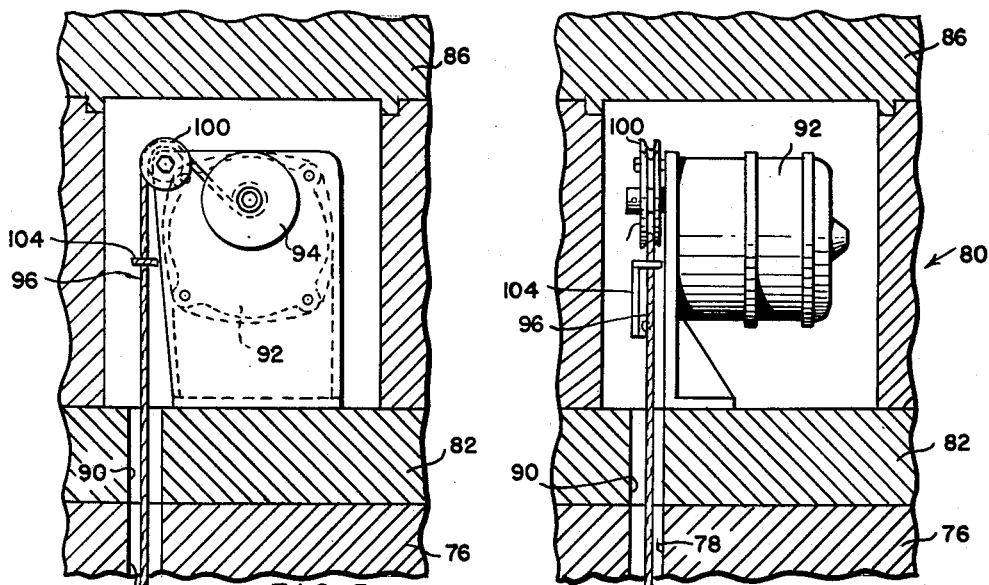
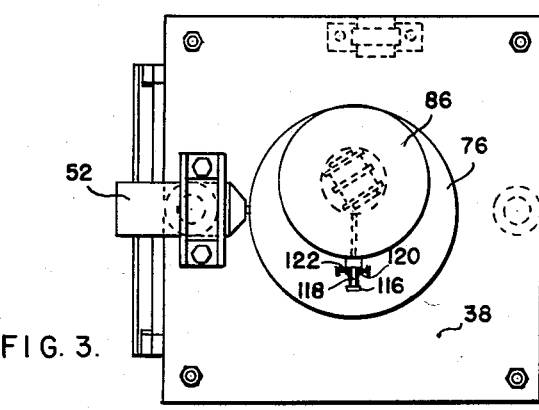
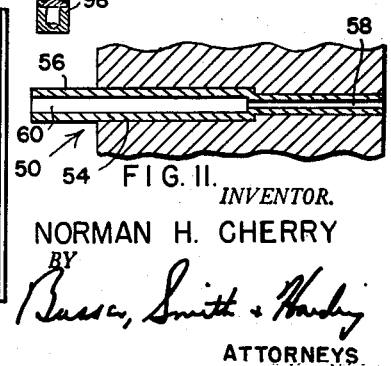
INVENTOR.
NORMAN H. CHERRY
BY
ATTORNEYS March 15, 1960 N. H. CHERRY 2,928,947
TESTING APPARATUS
Filed Nov. 6, 1953 4 Sheets-Sheet 3

INVENTOR.
NORMAN H. CHERRY
BY
ATTORNEYS

United States Patent Office 2,928,947
Patented Mar. 15, 1960

2,928,947

TESTING APPARATUS

Norman H. Cherry, Philadelphia, Pa., assignor to Nuclear Research Corporation, Philadelphia, Pa., a corporation of Pennsylvania Application November 6, 1953, Serial No. 390,487

14 Claims. (Cl. 250—71.5)

This invention relates to testing apparatus and has particular reference to the detection of flaws in articles, or to the precision measuring of thicknesses and densities of materials, by the utilization of radioactivity.

The use of gamma rays from radioactive materials for the detection of flaws in various articles is known but, generally, there have only been detectable flaws of considerable magnitude. It is one object of the present invention to provide apparatus for the detection of minute flaws as, for example, small voids in metallic objects. As will become apparent hereafter, the invention is applicable to the detection of minute cracks, voids, pits, etc., particularly in metallic articles. Specifically, the invention has been developed with particular reference to the detection of such flaws in artillery shells and the description will be primarily directed to apparatus useable for this purpose, though it is to be understood that various aspects of the invention are more broadly applicable than to the detection of flaws in hollow articles such as shells.

A further object of the invention is to provide apparatus for the continuous scanning of an object for the making of a record which may be examined at the completion of a scanning cycle without necessitating continuous alertness of an operator to the presence of a flaw during a scanning operation. Further objects of the invention relate to improved circuitry and various details of apparatus for accomplishing the objectives of the invention, and all of these objects will be become apparent from the following description, read in conjunction with the accompanying drawings, in which:

Figure 3 is a plan view of the apparatus illustrated in Figures 1 and 2;

Figure 4 is an enlarged detail showing a scintillation crystal assembly used in the apparatus;

Figures 5 and 6 are vertical sections illustrating the apparatus for the handling of the radioactive source of gamma rays;

Figure 11 is a fragmentary vertical section showing details of the construction of the gamma ray aperture;

Figure 1:
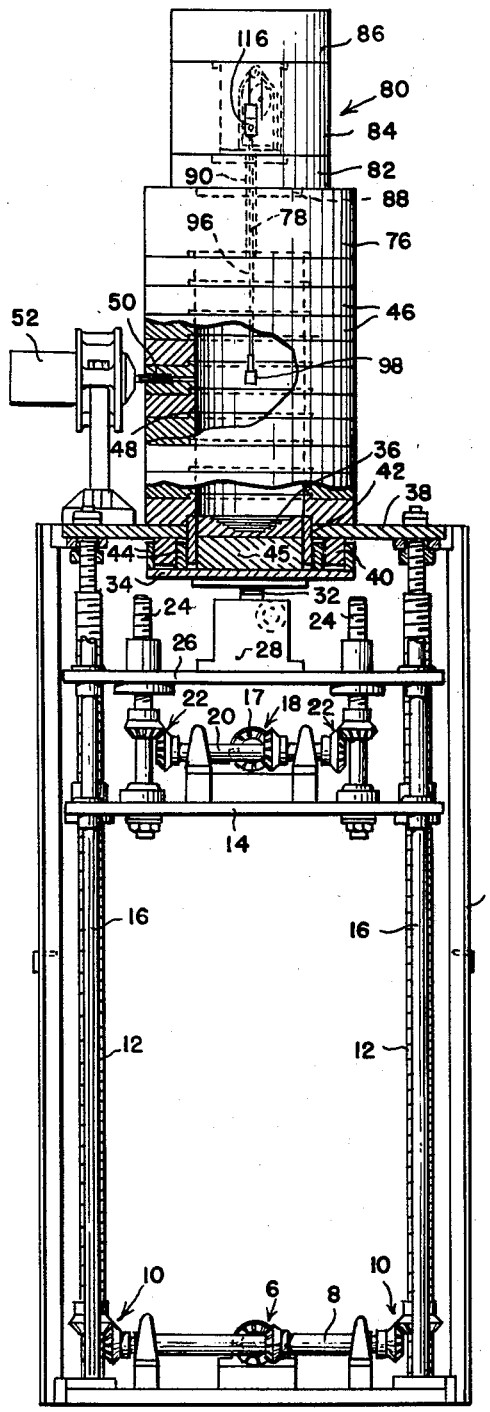
Figure 1 is an elevation, partly in section, of an apparatus embodying the invention.
Figure 2:
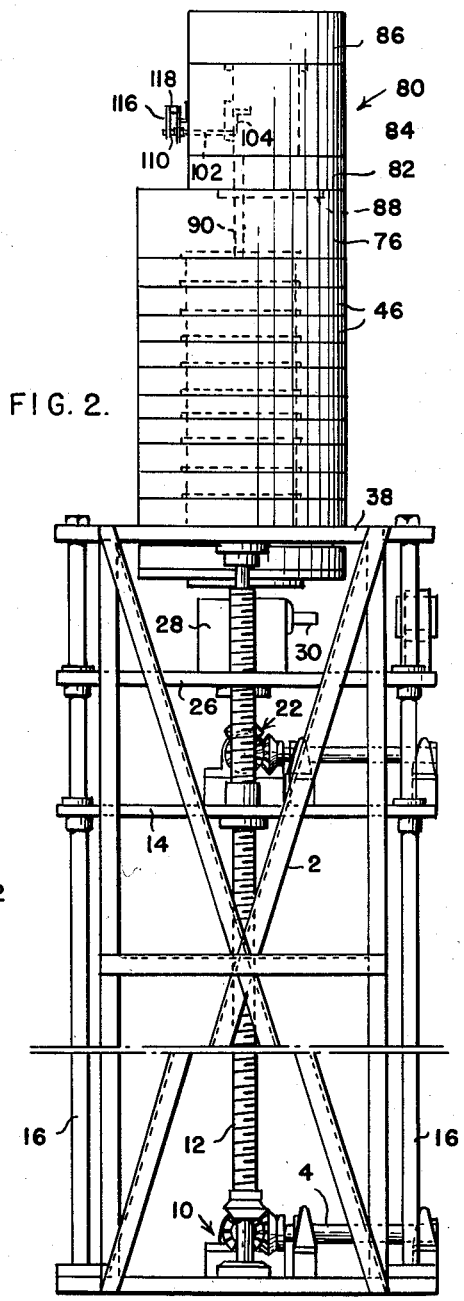
Figure 2 is a side elevation of the same apparatus, looking at the right of Figure 1.

The mechanical parts of the apparatus are mounted upon a frame 2. A shaft 4 at the frame base, driven by a motor (not shown) subject to manual control, drives through gearing 6 and a transverse shaft 8 and gearing 10 a pair of vertical screws 12 which are threaded through nuts carried by a platform 14 guided for vertical movement along upright rods 16. The platform 14 carries mounting means for a driving assembly for a second platform 26, which assembly comprises an input shaft 17 driven by a motor (not shown) which shaft 17 through gearing 18, shaft 20 and gearing 22 drives a pair of screws 24 seated in the platform 14 and threaded through nuts carried by the platform 26. The arrangement for moving vertically the platform 14 is operated solely for loading and unloading while with the platform 14 in a normal upper position the platform 26 is vertically driven to provide helical scanning of the article undergoing observation. It will be evident that a single platform might be driven vertically for both loading and scanning purposes, but it is convenient to provide the separate drives since for loading and unloading the movements are desirably at high speed while the vertical movements during scanning are relatively slow.

A reduction gearing assembly indicated at 28 is provided with an input shaft 30 driven by a suitable motor (not shown) through a flexible shaft. The reduction gear assembly 28 is carried by the platform 26 and its vertical output shaft 32 carries a plate 34 on which is mounted the article support 36, which in the case of the examination of shells may be provided with concentric steps for support of the shell in coaxial relationship with the shaft 32. An upper fixed plate 38 of the frame is provided with a depending lead ring 40 and with a second depending lead ring 42 which intermesh with lead rings 44 carried by the plate 34. A cylindrical lead block 45 is located between the article support 36 and the plate 34. As will appear hereafter, these lead elements and various others provide enclosure for the radioactive gamma ray source and prevent the dissemination of lethal radiations.

Stacked on the plate 38 are a series of lead rings 46 provided with interlocking flanges and grooves indicated at 48 provide a cylindrical chamber for the reception of the radioactive source and the article undergoing examination.

Extending radially through one of the rings 46 there is an aperture arrangement 50 which directs transmitted gamma rays to the scintillation detector generally designated 52.

The aperture arrangement is particularly illustrated in Figure 11. For fine scanning, it is necessary to provide an aperture having a bore of quite small diameter, for example, of the order of 0.030 inch, and it is very difficult to drill such an aperture through lead. It has been found desirable, therefore, to drill or case in the lead a larger opening and to insert into this opening, indicated at 54, a steel tube 56 provided at its inner end with a reduced bore 58 of desired diameter and at its outer end with a larger bore 60. The bore 58 determines the particular pencil of gamma rays which may reach the detector and, by reason of its small diameter, makes possible the scanning of very small voids in the article.

The scintillation type detector which is preferably used and which is shown generally at 52 comprises a shielding housing within which there is located an assembly of a scintillation crystal and a multiplier phototube. The arrangement of these elements is particularly illustrated in Figure 4, in which an aluminum can 62 encloses the crystal 64 which is pressed by an aluminum disc 66 and a spring 68 against the end of a multiplier phototube 69 which is sealed in the end of the can by a rubber sleeve 70 and wax 72, the voids within the can being desirably filled with silicone liquid 74 which serves as shock absorber, as a seal preventing moisture from reaching the deliquescent crystal, and, principally, as a means for optically coupling the crystal surface to the face of the phototube, the index of refraction being appropriate. Protection of the crystal is thus afforded and the parts are held in properly assembled relationship. Various types of crystals may be used and sodium thallium iodide crystals have been found very satisfactory.

Figure 7:
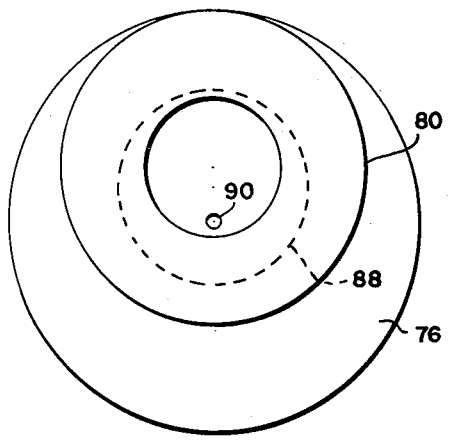
Figures 7 and 8 are diagrammatic plan views showing, in particular, the open and closed positions of the storage chamber for the radioactive material.
Figure 8:
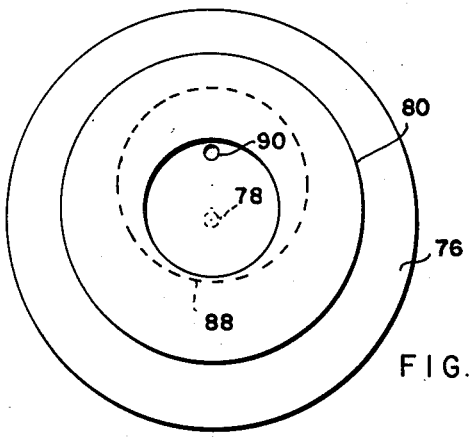

The chamber provided by the rings 46 is surmounted by a lead cap 76 centrally through which there extends a bore 78 for the introduction to, and removal from, the chamber of the gamma ray source. A storage chamber assembly 80 comprises a bottom member 82, a cylindrical member 84 and a cap 86, all of lead. The bottom member 82 is provided with a flange of circular shape which is received within a corresponding circular opening 88 in the cap 76, the circular opening being eccentric to the center of the chamber 46 and the axis of the bore 78. The member 82 is provided with a bore 90 of the same dimension as the bore 78 and which is arranged to be aligned therewith when the gamma ray source is being moved or is in position in the scanning chamber, but which may be rotated out of alignment with the bore 78 during storage of the source within the cylindrical member 84. The arrangement of the parts to accomplish this is illustrated in the diagrams of Figures 7 and 8, in the former of which the parts are shown with the bores 90 and 78 in alignment, and in the latter of which they are shown out of line so that if the source is within the cylinder 80 it is completely shielded.

Figure 9:
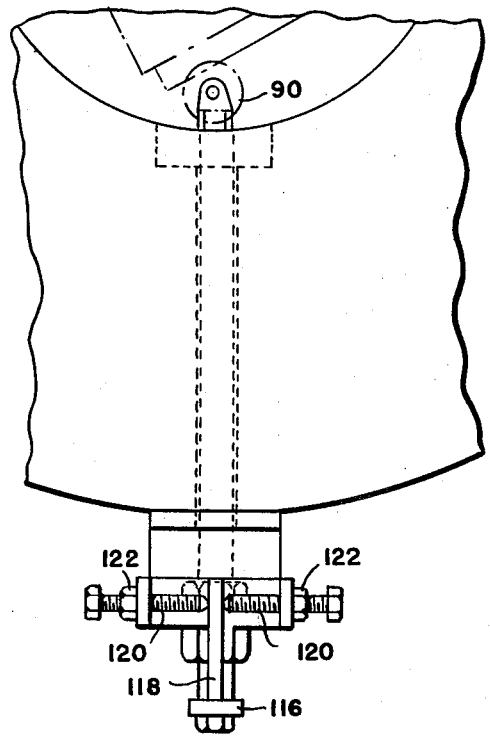
Figure 9 is a fragmentary plan view, partly diagrammatic, showing adjusting means for insuring accurate definite positioning of the radioactive material during a scanning operation.
Figure 10:
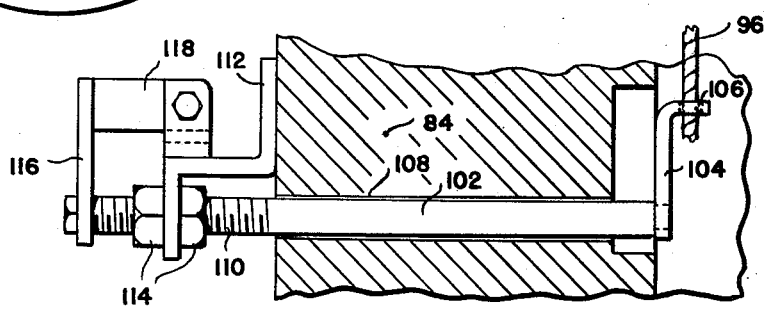
Figure 10 is an elevation of the same means, showing the wall of the storage chamber in section.

Within the cylindrical member 84 there is mounted a motor 92 having reduction gearing incorporated therein to provide slow and reversible drive of a reel 94 serving to wind a cord 96 which supports the capsule 98 containing the gamma ray source. This source may consist of any of numerous radioactive materials, but iridium 192 has been found particularly well adapted for the examination of steel shell walls. The cord 96 is trained over a pulley 100 which serves to align it vertically approximately with the axis of the bores 90 and 78 when these are in alignment. The alignment of the cord afforded by a pulley such as 100 is, however, not sufficiently accurate, and consequently there is desirably additionally provided guiding means illustrated in Figures 9 and 10.

This guiding means comprises a rod 102 which at its inner end carries an arm 104 provided with an aperture 106 which guides the cord 96. The aperture 106 has only slight running clearance with the cord so that the position of the cord may be accurately determined by the aperture. The rod 102 passes through an opening 108 in the cylindrical shell 84 and is threaded at 110 at its outer end and passes through an opening in a bracket 112 carried by member 84. Nuts 114 are threaded on the end 110 of the rod on opposite sides of the bracket and serve for adjustment of the rod 102 in an axial direction to move the aperture 106 radially with respect to the axis of the bores 78 and 90. The outer end of rod 102 carries an arm 116 provided with an extension 118 located between a pair of screws 120 threaded in the bracket 112 and provided with lock nuts 122. Manipulations of the screws 120 serve to rock the rod 102 and provide adjustment of the aperture 106 in a direction at right angles to that afforded by the lengthwise adjustment of the rod 102. Accordingly, by adjustment of the screws 120 and the nuts 114 and the locking of these in final position, the gamma ray source may be located precisely in line with the axis of the aperture 50 so far as horizontal positioning is concerned, the motor 92 being operated to a fixed position to secure vertical alignment for the scanning operation.

Figure 12:
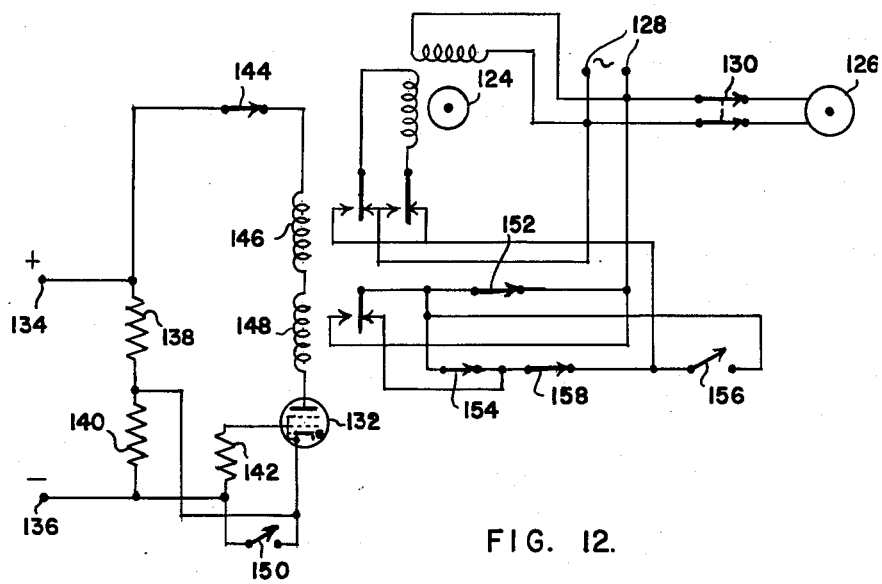
Figure 12 is a wiring diagram showing the scanning motor control circuit.

Figure 12 diagrams the motor drive involved in scanning and/or loading. In the foregoing description, indication was given of individual drives of the shafts 4 and 17, the former for loading, and the latter for scanning. If, however, the articles undergoing examination are relatively short in axial dimensions, the drive of shaft 17 may be omitted so that the platforms 14 and 26 move as a unit, the drive of shaft 4 being utilized for both loading and scanning. For simplicity of description, it will be considered that only shaft 4 is driven and the circuit of Figure 12 shows the control of a driving motor 124 for the shaft 4, this motor being of squirrel cage induction type wound for low starting and reversing torques. The motor driving shaft 30 is indicated at 126 as connected directly to the power supply terminals 128 through a manually operated switch 130. Usually, drive in only one direction is required but provision may be made for reversal of motor 126. It will be understood that with both motors 124 and 126 operating, the article being scanned will have a helical path of motion past the gamma ray source 98.

A thyraton 132 is supplied with direct current from the positive and negative terminals 134 and 136. A pair of resistors 138 and 140 are connected in series between these terminals and their junction is connected to the cathode of thyratron 132. The negative potential terminal 136 is connected through protective resistance 142 to the control grid of the thyratron. A switch 144 connects the positive terminal 134 through the relays 146 and 148 to the thyratron anode. The former of these relays is of double-pole double-throw reversing type connected to the main field of the motor, while the latter is of single-pole double-throw type. Switches 152, 154, 156 and 158 are connected as illustrated in Figure 12. Of these switches, 156 and 158 are manually operated ones. Switch 152 is a first upper limit switch and switch 150 is a second upper limit switch. Switch 154 is a first lower limit switch and switch 144 is a second lower limit switch. As will appear, these first and second limit switches are operated successively in the respective upward and downward movements of the platform 14 and are carried by the frame and are arranged to be actuated by engaging elements carried by the platform. The physical arrangements of these switches are not shown.

Assuming first that the platform 14 (and platform 26) are moving upwardly, the switches and relays will be in the positions illustrated, the relays 146 and 148 being deenergized by virtue of the negative bias applied to the control grid of the thyratron 132 with respect to its cathode. Under such circumstances, the motor 124 is operated to move the platforms upwardly. When the platforms reach the upper limit of their movement, the limit switch 152 is opened, thus deenergizing the main field of motor 124. The inertia of the motor, however, causes it to coast and engage, and close, the second upper limit switch 150. This shorts the bias on the thyratron grid, causing it to fire and energize both relays 146 and 148. The energization of relay 146 reverses the connections to the main motor field, and the energization of relay 148 reinstates energization of the motor despite the open condition of switch 152. The motor is, accordingly, reversed and the platforms are driven downwardly.

In the initial part of the downward motion, the switch 150 opens and the switch 152 closes. However, even though bias is again applied to the thyratron control grid, the tube continues conducting so as to maintain energization of both relays 146 and 148. The downward motion is accordingly not interrupted.

As the platforms approach the lower limiting position, the limit switch 154 is opened, deenergizing the motor, but the motor continues to coast to open the switch 144. The positive supply is thus removed from the anode of the thyratron, and relays 146 and 148 are deenergized. Reversal of the motor field connections is thus effected and switch 154 is short-circuited by the contact of relay 148 so that the motor again drives the platforms upwardly. As the upward movement takes place, switch 144 is first closed and then switch 154 is closed, restoring the circuit elements to their original position. It will be evident, therefore, that the platforms have a continuous upward and downward oscillatory motion continuing until the switch 158 is opened to stop such motion.

The oscillatory motion thus involved moves the article upwardly and downwardly past the gamma ray source during rotation of the article to effect scanning, the oscillatory motion being such that the platforms are not sufficiently lowered to remove the article from the scanning chamber. When it is desired to remove the article, the motor 92 is operated to remove the gamma ray source from the scanning chamber and withdraw it to the interior of the storage chamber 84. The assembly 80 may then be rotated to the position illustrated in Figure 8 so that the gamma ray source is safely shielded. The platforms may then be driven downwardly, as follows, to withdraw the article from the scanning chamber into position for unloading.

As described above, as the platform approaches its lower limiting position switch 154 is opened and then with opening of switch 144 reversal is normally effected to produce oscillatory operation. For unloading, switch 156 is manually closed during downward movement of the platform and as a result the opening of switch 154 does not deenergize the main motor field, and the motor continues to run at full speed. Switch 144 is opened and the connections of the main field are reversed by relay 146, but since the rotor is rotating at full speed, this continues despite the relative reversal of phases of the main and starting-reversing fields. As was mentioned the winding of the last mentioned field is for low starting and reversing torques and, therefore, it is ineffective to disturb continued rotation of the motor to lower the platform to unloading-loading level. The switch 156 is opened to arrest the platform at this level. When reloading is accomplished, switch 156 is again closed. The relative phase reversal of the field windings is now effective and the platform will be raised. After it reaches the range for automatic oscillatory operation switch 156 is opened and oscillation proceeds as described.

Figure 13:
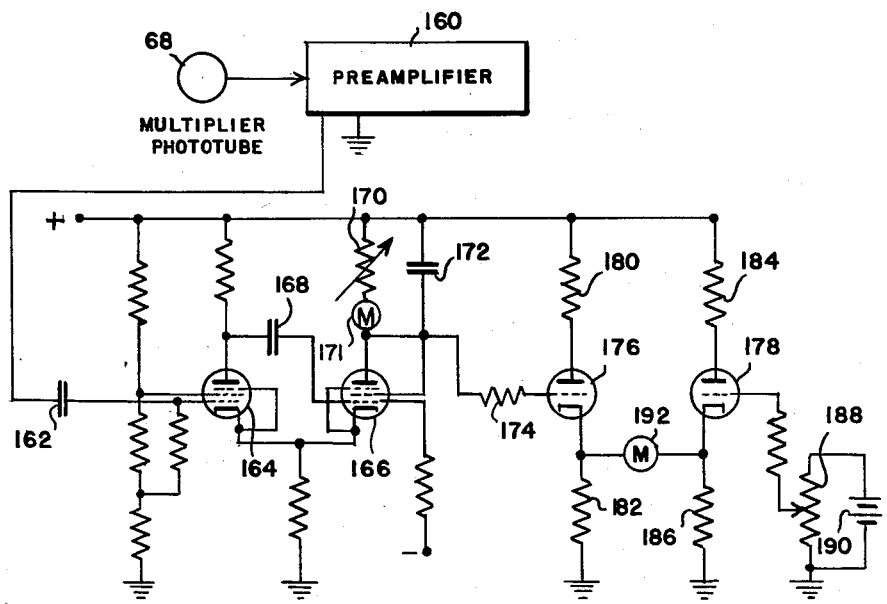
Figure 13 is a wiring diagram of the detecting and recording circuit.

Figure 13 illustrates the circuit for securing a record of response of the detector unit to the scanning operation. The multiplier phototube 68 is connected in conventional fashion and delivers its output to a conventional preamplifier indicated at 160 which is of a type to pass the pulses due to the flashing of the scintillation crystal by the gamma rays passing through the article undergoing examination and the aperture 50. The pulses from the preamplifier are delivered through condenser 162 to a monostable multivibrator which comprises the tubes 164 and 166 in a conventional circuit involving the connection of the anode of tube 164 to the control grid of tube 166 through a condenser 168. A variable resistor 170 in the anode circuit of tube 166 and the meter 171 in series with it are shunted by a condenser 172.

The purpose of the multivibrator just described is to provide negative pulses of constant width and constant amplitude corresponding to each pulse received from the preamplifier. The tube 164 is normally conducting and the tube 166 is normally non-conducting. Each negative pulse applied to the control grid of tube 164 throws the multivibrator into its unstable state from which it returns to its stable state after an interval determined primarily by condenser 168, the plate resistor of tube 164 and the grid resistor of tube 166. Negative pulses of constant width and constant amplitude are thus delivered from the anode of tube 166, while corresponding current pulses of constant width and amplitude flow through the meter 171 which reads their average value and consequently the average rate of the pulses delivered to the system at the crystal. This average rate of pulse frequency may be read to an accuracy of 0.5% over a frequency range of 0 to 10 pulses per second and the calibration is linear over that range. A resolution time of about one microsecond may be obtained which from a practical standpoint eliminates coincidence loss and the non-linearity which would be due thereto. Adjustment of resistor 170 serves to change the average current reading of meter 171 and serves also to change the time constant of the RC network.

The anode of tube 166 is connected to the grid of a triode 176 through resistance 174. A second companion triode 178 is provided, the triodes 176 and 178 being provided with respective anode resistances 180 and 184 of equal value for transient suppression and with respective cathode resistances 182 and 186 of equal value, the triodes being thus arranged as cathode followers. The potential of the grid of triode 178 is set by adjustment of potentiometer 188 which is provided with current from battery 190. A recording meter 192 is connected between the cathodes of the triodes 176 and 178 and serves to indicate the D.C. potential at the anode of tube 166 which, because of the filtering or integrating properties of the RC network of 170 and 172, is proportional to the average value of the constant amplitude and width current pulses, in turn proportional to the average frequency of the input pulses.

The operation of the apparatus as a whole will now be clear. As the helical scanning motion proceeds, the average number of gamma rays reaching the scintillation crystal and, hence, counted by the circuit of Figure 13 (in the sense of obtaining an indication of the average number per unit time by virtue of the reading of meter 192) will depend upon the amount of metal which is interposed by the article between the gamma ray source and the crystal. A void, representing less metal, will permit the passage of a greater number of gamma rays and indication of a void will thus result. The fineness of the scanning is due to the small size of the aperture 58, the aperture passing only those rays which are not intercepted by its walls and the surrounding lead shielding. As a consequence, very small bubbles, cracks, pits, and other irregularities in the article undergoing scanning may be detected. Inasmuch as a recording meter may be used at 192, it is unnecessary for an operator to watch continuously a meter, but rather the record may be examined at the completion of a scanning operation. Furthermore, by synchronizing the movement of the record sheet of the recording meter with the scanning movement, there may be ascertained the location of flaws and rechecking may be accomplished to determine whether a flaw actually exists or whether possibly some other disturbance to the apparatus may have resulted in the indication of an apparent flaw.

Due to the arrangement for withdrawing the gamma ray source from the scanning chamber, health hazards are avoided since, during placement and removal of the article to be examined, the source may be withdrawn into the storage chamber which may be closed by its rotation. It will, of course, be evident that interlocking switch arrangements may be provided to insure that the source cannot be located in the scanning chamber unless the article support is in its position closing off the possible downward passage of rays under conditions which might be hazardous.

While a single source of rays and a single detector have been illustrated, it will be evident that multiple detectors may be used with a single elongated source or with a plurality of sources to provide simultaneous scanning of different regions of the article simultaneously, there being provided a recording meter for each detector, thus minimizing the time necessary for the examination of an extended region of an article. While the apparatus may be used for the scanning of hollow articles which are solids of revolution, it may also be used for the scanning of articles which may not be symmetrical about an axis. In such case, variations of thickness presented to the detected beam of gamma rays will give varying readings, it will be evident that flaws may be detected by comparison of the results obtained with the results obtained from a standard article which is known to be without flaws.

What is claimed is:

1. Apparatus for the gamma ray examination of articles comprising a shielded enclosure having an aperture therein, a gamma ray source within said enclosure and aligned with said aperture, a detector of gamma rays outside said aperture and aligned therewith, means responsive to said detector for indicating the intensity of gamma rays emitted through said aperture, and means for rotating an article within said enclosure between said source and the aperture.

2. Apparatus for the gamma ray examination of articles comprising a shielded enclosure having an aperture therein formed by a tube extending through said shielded enclosure, a gamma ray source within said enclosure and aligned with said aperture, a detector of gamma rays outside said aperture and aligned therewith, means responsive to said detector for indicating the intensity of gamma rays emitted through said aperture, and means for rotating an article within said enclosure between said source and the aperture.

3. Apparatus for the gamma ray examination of articles comprising a shielded enclosure having an aperture therein, a gamma ray source within said enclosure and aligned with said aperture, a detector of gamma rays outside said aperture and aligned therewith, means responsive to said detector for indicating the intensity of gamma rays emitted through said aperture, and means for moving linearly an article within said enclosure between said source and the aperture.

4. Apparatus for the gamma ray examination of articles comprising a shielded enclosure having an aperture therein, a gamma ray source within said enclosure and aligned with said aperture, a detector of gamma rays outside said aperture and aligned therewith, means responsive to said detector for indicating the intensity of gamma rays emitted through said aperture, and means for moving in a helical path an article within said enclosure between said source and the aperture.

5. Apparatus for the gamma ray examination of articles comprising a shielded enclosure having an aperture therein, a gamma ray source within said enclosure and aligned with said aperture, a detector of gamma rays outside said aperture and aligned therewith, means responsive to said detector for indicating the intensity of gamma rays emitted through said aperture, and means for moving an article into and out of said enclosure and for rotating said article within said enclosure between said source and the aperture.

6. Apparatus for the gamma ray examination of articles comprising a shielded enclosure having an aperture therein, means providing a shielded storage chamber, means selectively providing communication between the interior of said enclosure or interrupting said communication, means for moving a gamma ray source between said enclosure and said storage chamber through said communication means, a detector of gamma rays outside said aperture and aligned therewith, means responsive to said detector for indicating the intensity of gamma rays emitted through said aperture, and means for locating an article between said source and the aperture.

7. Apparatus for the gamma ray examination of articles comprising a shielded enclosure having an aperture therein, means providing a shielded storage chamber, means selectively providing communication between the interior of said enclosure or interrupting said communication, means for moving a gamma ray source between said enclosure and said storage chamber through said communication means, a detector of gamma rays outside said aperture and aligned therewith, means responsive to said detector for indicating the intensity of gamma rays emitted through said aperture, and means for rotating an article between said source and the aperture.

8. Apparatus for the gamma ray examination of articles comprising a shielded enclosure having an aperture therein, means providing a shielded storage chamber, means selectively providing communication between the interior of said enclosure or interrupting said communication, means for moving a gamma ray source through said communication means between a position in said enclosure in alignment with said aperture and a position in said storage chamber, a detector of gamma rays outside said aperture and aligned therewith, means responsive to said detector for indicating the intensity of gamma rays emitted through said aperture, and means for locating an article between said source and the aperture.

9. Apparatus for the gamma ray examination of articles comprising a shielded enclosure having an aperture therein, means providing a shielded storage chamber, means selectively providing communication between the interior of said enclosure or interrupting said communication, motor operated within said storage chamber for moving a gamma ray source between said enclosure and said storage chamber through said communication means, a detector of gamma rays outside said aperture and aligned therewith, means responsive to said detector for indicating the intensity of gamma rays emitted through said aperture, and means for locating an article between said source and the aperture.

10. Apparatus for the gamma ray examination of articles comprising a shielded enclosure having an aperture therein, means providing a shielded storage chamber, means for mounting said storage chamber for rotation relatively to said enclosure for selectively providing communication between the interior of said enclosure or interrupting said communication, means for moving a gamma ray source between said enclosure and said storage chamber through said communication means, a detector of gamma rays outside said aperture and aligned therewith, means responsive to said detector for indicating the intensity of gamma rays emitted through said aperture, and means for locating an article between said source and the aperture.

11. Apparatus for the gamma ray examination of articles comprising a shielded enclosure having an aperture therein, a gamma ray source within said enclosure and aligned with said aperture, a detector of gamma rays outside said aperture and aligned therewith, means responsive to said detector for indicating the intensity of gamma rays emitted through said aperture, and means for automatically cyclically moving an article in the direction of an axis within said enclosure and for rotating it about said axis between said source and the aperture.

12. Apparatus for the gamma ray examination of articles comprising a shielded enclosure having an aperture therein, a gamma ray source within said enclosure and aligned with said aperture, a detector of gamma rays outside said aperture and aligned therewith, means responsive to said detector for indicating the intensity of gamma rays emitted through said aperture, and means for rotating an article within said enclosure between said source and the aperture, said responsive means comprising means for emitting pulses of fixed width in response to gamma rays impinging upon said detectors, and means responsive to the average value of said pulses.

13. Apparatus for the gamma ray examination of articles comprising a shielded enclosure having an aperture therein, a gamma ray source within said enclosure and aligned with said aperture, a detector of gamma rays outside said aperture and aligned therewith, means responsive to said detector for indicating the intensity of gamma rays emitted through said aperture, and means for rotating an article within said enclosure between said source and the aperture, said responsive means comprising a monostable multivibrator for emitting pulses of fixed width in response to gamma rays impinging upon said detector, and means responsive to the average rate of said pulses.

14. Apparatus for the gamma ray examination of articles comprising a shielded enclosure having an aperture therein, a gamma ray source within said enclosure and aligned with said aperture, a scintillation crystal detector of gamma rays outside said aperture and aligned therewith, means responsive to said detector for indicating the intensity of gamma rays emitted through said aperture, and means for rotating an article within said enclosure between said source and the aperture.

References Cited in the file of this patent

UNITED STATES PATENTS

| | | |
|---|---|---|
| 2,078,768 | Meier | Apr. 27, 1937 |
| 2,383,478 | Friedman et al. | Aug. 28, 1945 |
| 2,477,307 | Maekta | July 26, 1949 |
| 2,506,435 | Rossi et al. | May 2, 1950 |
| 2,525,292 | Fua et al. | Oct. 10, 1950 |
| 2,528,521 | Kaiser | Nov. 7, 1950 |
| 2,533,701 | Watt et al. | Dec. 12, 1950 |
| 2,537,914 | Roop | Jan. 9, 1951 |
| 2,584,962 | Gross | Feb. 5, 1952 |
| 2,602,142 | Meloy | July 1, 1952 |
| 2,687,477 | Pfaff | Aug. 24, 1954 |
| 2,705,289 | Youmans | Mar. 29, 1955 |
| 2,712,081 | Fearon et al. | June 28, 1955 |